United States Patent [19]

Karlsson et al.

[11] Patent Number: 5,572,312
[45] Date of Patent: Nov. 5, 1996

[54] ARRANGEMENT FOR CALIBRATION OF AT LEAST ONE RADIATION-SENSITIVE DETECTOR MEANS

[75] Inventors: Lars Karlsson, Taby; Ulf Handberg, Upplands Vasby, both of Sweden

[73] Assignee: Agema Infrared Systems AB, Danderyd, Sweden

[21] Appl. No.: 343,470
[22] PCT Filed: May 26, 1993
[86] PCT No.: PCT/SE93/00465
§ 371 Date: Jan. 17, 1995
§ 102(e) Date: Jan. 17, 1995
[87] PCT Pub. No.: WO93/24815
PCT Pub. Date: Dec. 9, 1993

[30] Foreign Application Priority Data

May 26, 1992 [SE] Sweden .................................. 9201655
May 26, 1992 [SE] Sweden .................................. 9201656

[51] Int. Cl.⁶ ................................ G01J 5/52; H04N 5/33
[52] U.S. Cl. ........................ 356/46; 250/252.1; 348/164; 348/168
[58] Field of Search ................................ 356/46; 348/146, 348/164, 166, 167, 168; 250/252.1 A

[56] References Cited

U.S. PATENT DOCUMENTS 3,895,182  7/1975  Trilling .
3,935,382  1/1976  Hunt .
4,331,874  5/1982  Duncan et al. ......................... 250/347
4,419,692  12/1983  Modisette et al. .
4,482,252  11/1984  Lorenz .............................. 250/252.1 A

FOREIGN PATENT DOCUMENTS 2225914  6/1990  United Kingdom .
2242741  10/1991  United Kingdom .

Primary Examiner—Vincent P. McGraw
Attorney, Agent, or Firm—Young & Thompson

[57] ABSTRACT

An arrangement for calibration of at least one radiation-sensitive detector, comprising an aperture (90), at least one reference body (50, 60, 600) which emits radiation with a measurable intensity, at least one deflection member (160, 170, 620) which deflects radiation from the reference body, and at least one radiation-sensitive detector (30) which detects the radiation value and generates an output signal dependent on the detected radiation value. During reference measurement the deflection member is arranged to reproduce the aperture (90) on the reference body (50, 60, 600), and the deflection member (160, 170, 620) deflects the radiation such that the midpoint of the reproduction of the aperture (90) remains on substantially the same area of the surface of the reference body (50, 60, 600) during that time period in which the detector receives radiation which is transmitted from the reference body and which passes through the aperture (90).

14 Claims, 5 Drawing Sheets

ARRANGEMENT FOR CALIBRATION OF AT LEAST ONE RADIATION-SENSITIVE DETECTOR MEANS

The present invention relates to an arrangement for calibration of at least one radiation-sensitive detector means.

BACKGROUND OF THE INVENTION

Within the field of image recording, such as thermal cameras for example, it is known to make use of an optical line sweep system in which an object is scanned at high speed along a line with the aid of a rotating drum provided with continuous reflecting faces arranged around the drum. An image sweep perpendicular to the line can also be achieved, for example using a rocking mirror or a second drum which rotates at a lower speed than the drum for the line sweep. In this manner the object is scanned in grid form. The radiation is transmitted through such a system via one or more deflection members such as lenses or mirrors to one or more radiation detectors. The radiation detector or detectors also receive radiation from one or more reference bodies which constitute sources of radiation such as, for example, infra-red radiation. It is known to arrange the reference body in such a manner that both the object and the reference body are scanned during one sweep, whereby the image sweep scans the reference body at the start and finish respectively of the sweep.

In most types of optical sweep systems with drums provided with mirrored faces which function as sweep-generating elements, the faces are normally installed so that they reflect in a collimated radiation path. The radiation beam which is reflected by the faces and other deflection members thus has a certain width. There are however sweep systems in which the faces are arranged in convergent or divergent radiation paths.

Even with convergent or divergent radiation paths, the radiation beam must however have a certain width. Because of the width of the radiation beam, difficulties are created with double imaging which arises in connection with the switching of the radiation path between two faces. This arises because radiation during switching from one face to another face will arrive at the detector from two directions, i.e. radiation coming simultaneously from both the rear portion of one face and from the front portion of the next face on the drum. These two radiation beams originate from separate parts of the object and thus give rise to double imaging during a portion of the sweep. This double imaging effect implies that not all of the sweep can be used, which explains why the sweep efficiency of such arrangements is not as high as is desirable.

By analogy with the above, a double imaging effect arises during the transition of the sweep from scanning the object to scanning the reference body, which also implies that the sweep efficiency is not as high as is desirable. In addition, the scanning sweep across the reference body implies that very high demands are placed on uniform temperature distribution over the reference body since it is of utmost importance that the detector always records the same temperature from the reference body.

More recently, new technology having no moving parts for the actual image detection has started to be used, whereby the detector is in the form of a flat detector grouping (Focal Plane Array, FPA) placed in an image plane. Each image pixel is formed by its own detector element. This technology has previously been regarded as expensive, though it is now coming down to a more affordable price. This technology is not completely new and a plurality of FPA-arrangements have been produced which differ primarily in the different detector material. An infra-red camera according to the known technology can incorporate temperature references which are automatically introduced into the radiation path to the detector or detector elements several times per image and from which the infrared camera can calibrate itself.

Those FPA systems which have until now been introduced onto the market do not contain actual temperature references. Neither can they measure temperature particularly well. They do, however, often contain a disc having a uniform temperature which at certain instances can normally automatically be displaced into the radiation beam so that all of the detector elements can be calibrated to emit the same output signal when they observe object points having the same temperature. There are also variations to FPA systems in which the whole camera can be made to observe an external temperature reference disc so that even the amplification from each individual detector element, i.e. each pixel, can be calibrated. These known systems are, however, burdened with the problem that the temperature reference disc must be at least as big as the pupil in the system and placed next to the pupil. Alternatively, it is necessary that the temperature reference disc is maintained at a very uniform temperature so that the various detector elements in the detector grouping are able to read the same temperature. Reading the same temperature is of utmost importance in order to be able to achieve temperature calibration of the image system.

OBJECTS OF THE INVENTION

The main object of the present invention is to provide an arrangement for calibration of one or more radiation detectors without influence, or at least with reduced influence, from uneven temperature distribution over a reference body.

A further object of the present invention is to provide an arrangement for temperature calibration such that a true temperature can be read by the infra-red camera.

Yet a further object of the present invention is to provide an arrangement for image calibration so as to obtain an image whose temperature colour scale is uniform across the entire image which is generated.

BRIEF DESCRIPTION OF THE DRAWINGS

In order to better understand the present invention, it will be now described by way of example only and with reference to the attached drawings in which

FIG. 1

FIG. 1 shows a side view of a system 10 for image recording. The system 10 comprises an essentially optical subsystem 20, a detector 30 and a calibration unit 40. By means of the system 10, calibration of detectors can be performed according to the invention.

Figure 1:
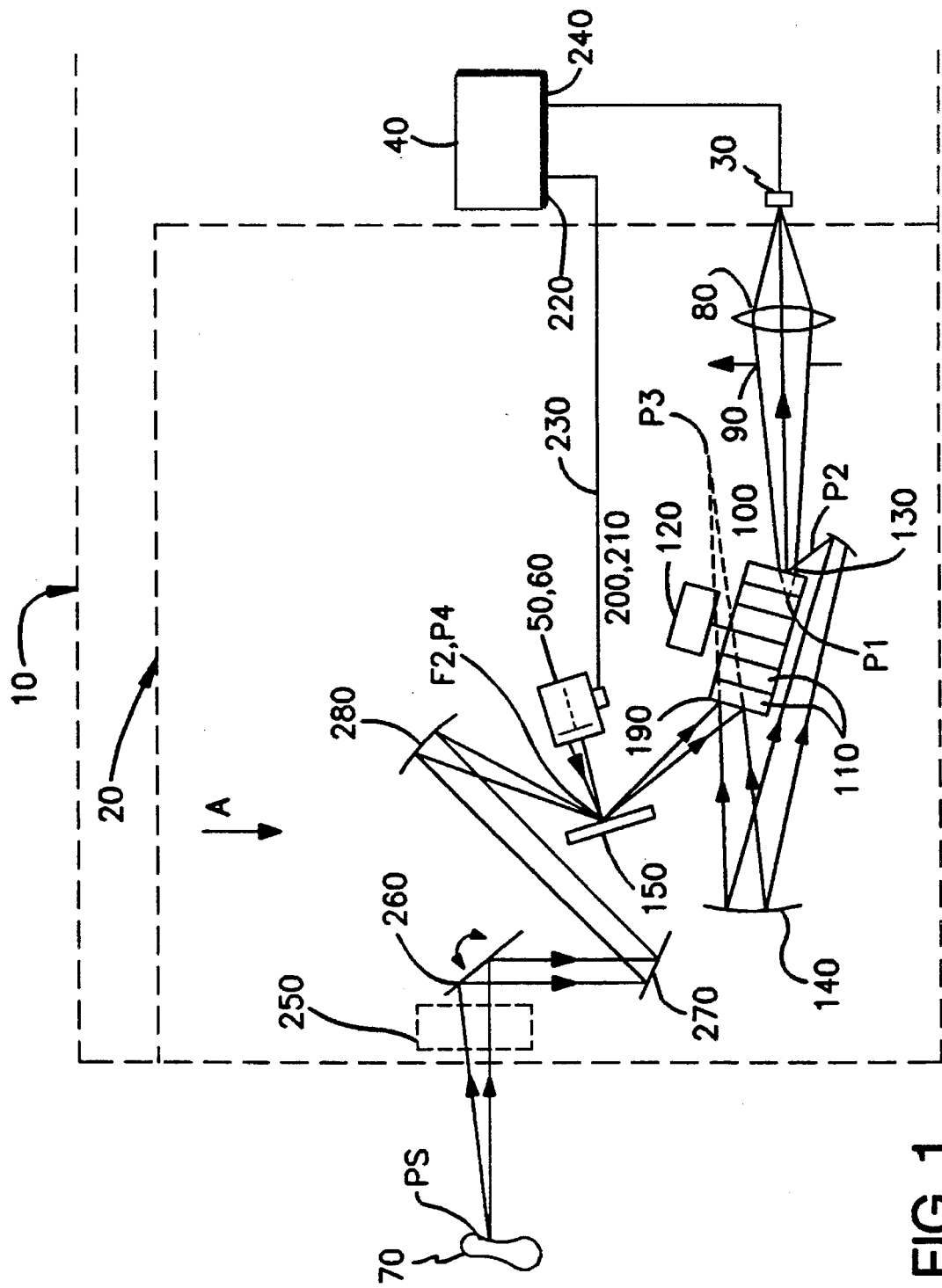
FIG. 1 shows a side view of a system for image recording according to the invention.

The system 10 will be described below starting from the field of view which the radiation detector 30 has. The function of the system is best understood if the radiation path is followed from the detector 30 to a first reference body 50, or a second reference body 60, although in reality the radiation takes place in the opposite direction. The system is further described starting from a heat-radiating object 70 whose radiation path is followed to the detector 30. Although the system will be described in the following with one detector 30, it is of course within the scope of the invention to use a plurality of detectors in order to detect radiation.

The radiation which arrives at the detector 30 has just come from a relay optical system, schematically shown as a lens 80 in FIG. 1, and an aperture-diaphragm 90. The aperture-diaphragm 90 serves to screen any scattered light which otherwise would be able to arrive at the detector and become a source of interference. The detector 30 observes the aperture-diaphragm 90, and all radiation which reaches the detector through the opening of the diaphragm 90 comes from the object 70 or from any one of the reference bodies 50 or 60.

In order to achieve scanning of an object 70, a method called face-following is employed. The radiation which arrives at the detector 30 comes from a rotating drum 100 which is provided with mirrored faces 110 which are arranged continuously along the periphery of the drum. The drum 100 is rotatably driven by a motor 120. The relay optic 80 can reproduce the detector 30 at an image point P1 a little beyond the faces 110. The stationary image point P1 is a mirror-image of a real image point P2 which, because of the reflection of the radiation beam in one of the face surfaces 110, moves in an arc during rotation of the drum.

The image point P2 is reproduced by mirrors 130 and 140 at an image point P3 behind the faces 110. Because, during a sweep, the image point P2 follows an arc, the image point P3 follows an arc in space. The image point P3 is, because of the reflection of the radiation in the present face, a mirror-image of the real image point P4 in space away from the drum. During rotation of the drum, the image point P4 follows an arc-shaped focal line F2 which has substantially the shape of a circular arc. The detector 30 is thus reproduced at the image point P4 on a certain scale, for example three times magnification.

As the drum 100 with faces 110 rotates, it causes, in cooperation with the mirror 130 and the mirror 140, the field of view of the detector to horizontally sweep a deflection arrangement 150 on the focal line F2. Since the shaft of the motor 120 rotates clockwise, the field of view of the detector will scan inwardly, in FIG. 1 away from the observer, and thereby scan along the focal line F2 (FIG. 2) of the deflection arrangement 150. In this manner, the horizontal sweep, or line sweep, of the system is achieved.

The deflection arrangement 150 comprises a first deflection member 160 (FIG. 2) which is placed at the end of the deflection arrangement 150 at which the sweep commences, a second deflection member 170 (FIG. 2) which is located at the end of the deflection arrangement 150 at which the sweep terminates, and an optical arrangement 180 (FIG. 2) which is located between the first deflection member 160 and the second deflection member 170.

The deflection members 160 and 170 can for example be in the form of one or more mirrors and/or one or more lenses, or some combination thereof.

Just as the detector 30 is reproduced on the image point P4 on the focal line, so the aperture 90 with emphasis on a pupil 190 is reproduced on the part of the drum 100 which faces towards the deflection arrangement 150. The pupil 190 is in turn reproduced on the reference body 60 because of the deflection of the radiation by the deflection member 170.

When the field of view of the detector 30 scans the first deflection member 160, the radiation path is interrupted by the deflection member 160 in such a manner that the field of view of the detector observes substantially the same surface of the first reference body 50. This can also be expressed that substantially the same surface of the first reference body 50 during the entire time is reproduced on the pupil 190, which in turn is reproduced on the aperture diaphragm 90. The reference body 50 is thus reproduced on the diaphragm 90, though the reverse also applies in that the diaphragm 90 is reproduced on the reference body 50. The field of view of the detector observes the aperture-diaphragm 90.

The reference body 50 forms a source of radiation, for example infra-red radiation, whereby the intensity of the radiation depends on the temperature of the reference body. Since the aperture-diaphragm 90 is accordingly reproduced on the reference body 50, the detector receives radiation originating from the reference body, and the detector 13 thus generates an output signal whose level is dependent on the intensity of the radiation. Since the intensity of the radiation depends on the temperature of the reference body, the output signal of the detector is accordingly dependent on the temperature of the reference body. The reference body 50 can for example be in the form of an insulated heating element or a cooling element whose temperature can be adjusted and/or measured.

A temperature sensor 200, 210 is arranged on each reference body 50, 60, the sensors detecting the temperature of respective reference bodies 50, 60. The temperature sensors 200 and 210 which sense the temperatures of the reference bodies 50, 60 respectively, are connected to a first input 220 of the calibration unit 40 via a wire 230. A second input 220 to the calibration unit 40 is connected to the detector 30. The calibration unit 40 receives information at the first input 220 concerning the measured temperature in the reference body and, at the second input 240, information concerning the radiation value which is registered by the detector 30. The calibration unit 40 is also provided with information regarding when respective reference bodies 50, 60 are scanned and can thereby relate a radiation value which is registered during scanning of, for example, the reference body 60 to the temperature which is measured on the same reference body. The calibration unit 40 can also be provided with a third input for the receival of signals from a further unit which is described later in the text.

Figure 2:
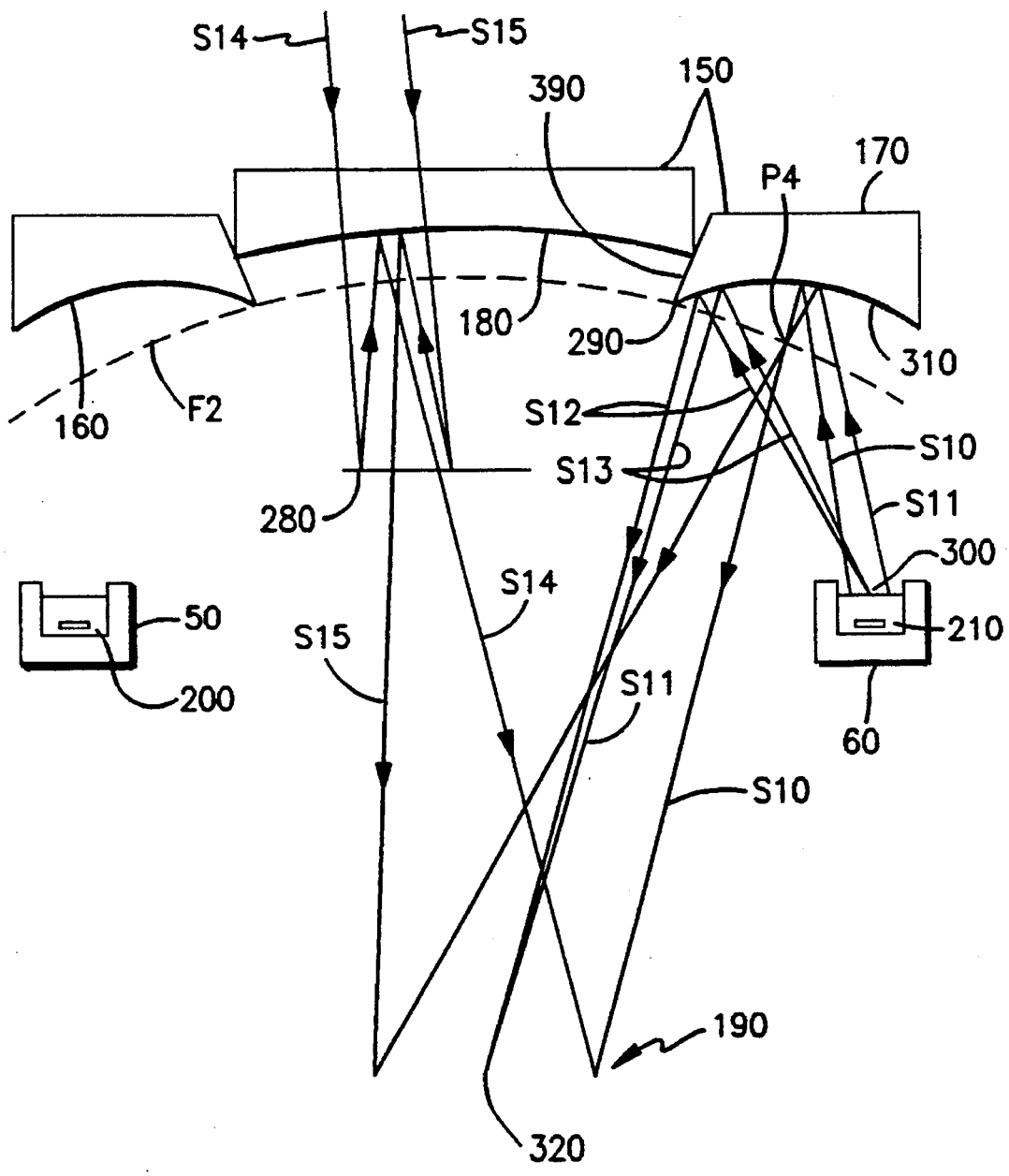
FIG. 2 shows a schematic plan view of a deflection arrangement in the image recording system according to the invention seen in the direction of arrow A in FIG. 1.

When the field of view of the detector scans the optical arrangement 180, the radiation path is interrupted in such a manner that the detector 30 "sees" the object 70. The system will be described in the following by following the radiation path of the radiation which originates from the object 70 on its way to the detector means 30. Radiation which is emitted from the object 70 is collected by an objective optical means 250. The radiation is reflected via a rocking mirror 260 to a mirror 270 and therefrom to a mirror 280. The mirror 280 causes the radiation path to converge to the focal line F2 of the deflection arrangement 150, as shown in FIG. 2. Thus, a reproduction or an intermediate image of the object 70 is achieved on the focal line F2. The rocking mirror 260 undergoes a rocking motion which affects the radiation path such that the image projected on the focal line F2 sweeps in a vertical direction. In this manner the vertical sweep or image sweep of the system is attained.

The image point P5 is shown in FIG. 1 and is a reproduction of the image point P4. When, during the horizontal sweep, the image point P4 moves along the focal line F2, the image point P5 moves along a line on the object 70. Because of the rocking motion of the rocking mirror 260, the vertical sweep is obtained, thereby implying that the image point P5 scans the entire object 70 in grid form.

As described above, the field of view of the detector scans the optical arrangement 180. With the horizontal sweep along the focal line F2, the detector 30 scans a reproduction of an actual horizontal portion of the object 70. Radiation originating from the object and reflected towards the optical arrangement 180 thus passes through the focal line F2 and spreads in a direction towards the drum 100 with faces 110. During the horizontal sweep, the radiation is reflected at one face 110 and is transmitted via the mirror 140 and the mirror 130 further to a face 110 and on via the diaphragm 90 and the relay optical system 80 to the detector 30. The detector thus alternately receives radiation from the reference bodies and from the object.

At the end of the sweep, when the second deflection member 170 is scanned, the radiation path is interrupted by the deflection member 170 in such a manner that the detector 30 during the entire period observes substantially the same surface of the second reference body 60. In other words, this means that the detector 30, during the entire end phase of the sweep, receives radiation from one and the same surface of the second reference body 50. The first reference body 50 and the second reference body 60 can have different temperatures. In this manner, one and the same detector 30 can be calibrated against reference bodies 50, 60 having two different temperatures.

The first reference body 50 can be allowed to operate at ambient temperature or the temperature of the image recording system 10, whilst the second reference body 60 can be adjusted to a predetermined temperature. It further lies within the scope of the invention to vary the temperature of the second reference body 60 in a predetermined manner in order to achieve calibration of the detector against a plurality of different temperatures.

It should be noted that one of the temperature reference bodies can be a cooling element which can be cooled by means of a drive circuit and servo-regulated to a desired temperature. It is also possible during image recording to control the temperature reference bodies variably with time so that the temperatures thereof increase e.g. ramp-like or have a saw-tooth shaped varying temperature. In such a case only one temperature reference body is in fact needed. It is of course also possible to have both a cooling element and a heating element with time-varying temperature as temperature reference bodies.

FIG. 2

The deflection arrangement can thus, for example, comprise two deflection members 160, 170 which are symmetrically placed on either side of an optical arrangement 180. The optical arrangement 180 is shaped and arranged in such a manner that it transmits light originating from the object to the pupil 190 of the system (see FIG. 1).

In the following, and for the sake of simplicity, the function and construction of the second deflection member 170 is described. The construction and function of the first deflection member 160 is totally analogous with this.

In the first embodiment, the optical arrangement 180 is in the form of a mirror. It falls within the scope of the invention, however, to allow the optical arrangement 180 to be in the form of a lens or quite simply to leave the space empty and to place the lens of the system such that radiation from the object on its way to the pupil 190 of the system passes between the first deflection member 160 and the second deflection member 170.

The second deflection member 170 is arranged to the side of, and borders against, the optical arrangement 180. During the sweep, a reproduction of the detector moves along the arc shaped focal line F2 over surfaces of the deflection member 170 and the optical arrangement 180.

The part of the deflection member 170 which borders against the optical arrangement 180 is provided with a pointed region, whose tip 290 forms a tangent to the focal line F2. Due to this arrangement of the tip 290, during scanning a very quick transition is achieved between the object 70 and the reference body. In this manner, loss of image points is minimized during transition between image and reference and the sweep efficiency is maximized. Since the width of the radiation beam is at its minimum on the focal line, the double imaging effect is minimized. The side 390 of the pointed region which faces towards the optical arrangement 180 is shaped such that it does not obscure the radiation path from the object 70 via the optical arrangement 180 to the system's detector 30.

In FIG. 2, two beams S10 and S11 are shown which are transmitted from the reference body 60. The beams are reflected at the deflection member 170 in such a manner that the beams cross each other on the focal line F2. When, during its path along the focal line F2, the image point P4 arrives at the point where the beams S10 and S11 cross each other, the beams S10 and S11 are transmitted via the pupil 190, the faces 110 and the optical components 140, 130 and 80 to the detector 30 as described above.

Two further beams S12 and S13 are shown in FIG. 2 which are transmitted somewhat divergently from a focal point 300 on the reference body 60. The beams S12 and S13 are reflected towards the reflecting surface 310 of the deflection member 170 in such a manner that the beams converge to a second focal point 320 on the pupil 190. This illustrates that the reference body 60 is sharply reproduced on the pupil 190.

In accordance with an alternative embodiment, a further plurality of deflection members with corresponding reference bodies are arranged to the side of the deflection member 170, which permits the detector to be calibrated against a plurality of temperature references since these too can be scanned during the sweep. Additional deflection members can also be placed at the first deflection member 160 so that these can be scanned at the start of the sweep.

Two collimated beams S14 and S15 are also shown in FIG. 2 which originate from the object 70 and come most recently from the mirror 270. The beams S14 and S15 are reflected by the mirror 280 in a direction towards the optical arrangement 180 which is in the form of a mirror. After reflection in the optical arrangement 180, the beams intersect each other on the focal line F2. When the image point P4 during its path along the focal line F2 arrives at the point at which the beams S14 and S15 cross each other, the beams S14 and S15 are transmitted via the pupil 190, the faces 110 and the optical components 140, 130 and 80 to the detector 30 as described above.

FIG. 3 AND FIG. 4

In order to more easily understand the invention, a comparison between the known art (FIGS. 3 and 4) and the invention (FIGS. 5 and 6) is given below.

Figure 3:
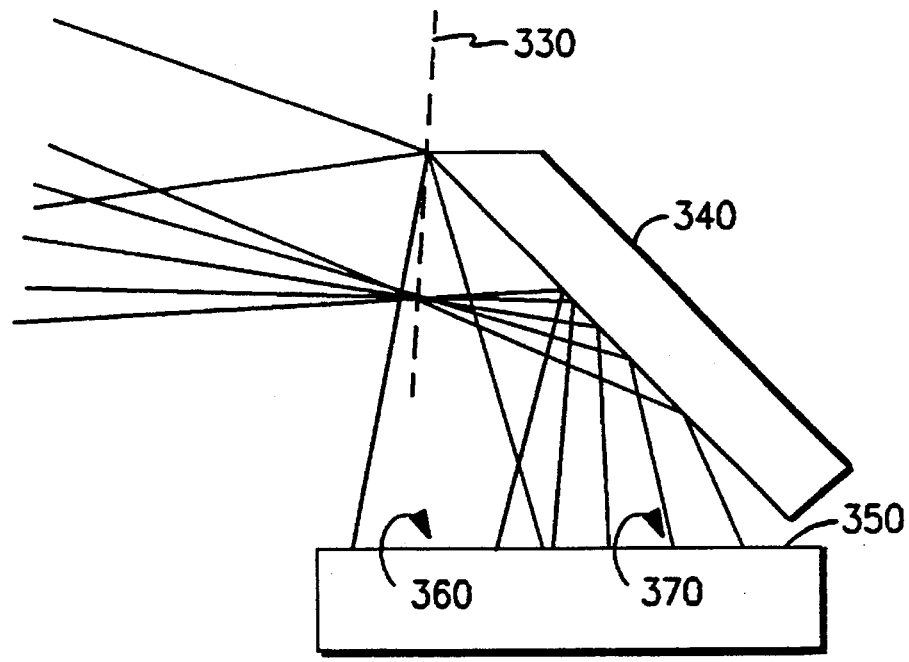
FIG. 3 shows the radiation path at a deflection member and a temperature reference body according to the known art.
Figure 4:
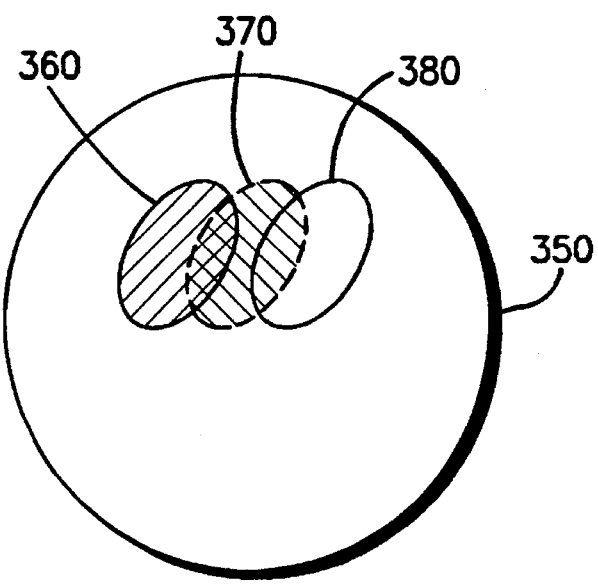
FIG. 4 shows the field of view of a detector which sweeps over the temperature reference body according to the known art.

With reference to FIGS. 3 and 4, a short summary of how scanning of a temperature reference body is carried out according to the prior art is given. FIG. 3 shows a focal line 330 which runs over a deflection member 340. The deflection member 340 is arranged in such a manner that radiation from a reference body 350 is deflected towards a detector (not shown).

When scanning is carried out, an image point analogous to the image point P4 in FIG. 2 moves along the focal line, and the detector in the system is reproduced on the reference body 350. Since the deflection member 340 is in the form of a flat mirror, the reproduction of the system's detector sweeps over the surface of the reference body 350 when the image point moves along the focal line.

With uneven temperatures of the reference body 350, a first radiation value based on radiation from a first surface 360 is thus achieved, as well as a second radiation value which differs from the first value, based on radiation from a second surface 370, and a third radiation value which differs from both others based on radiation from a third surface 380 (see FIG. 4).

FIGS. 5 AND 6

Figure 5:
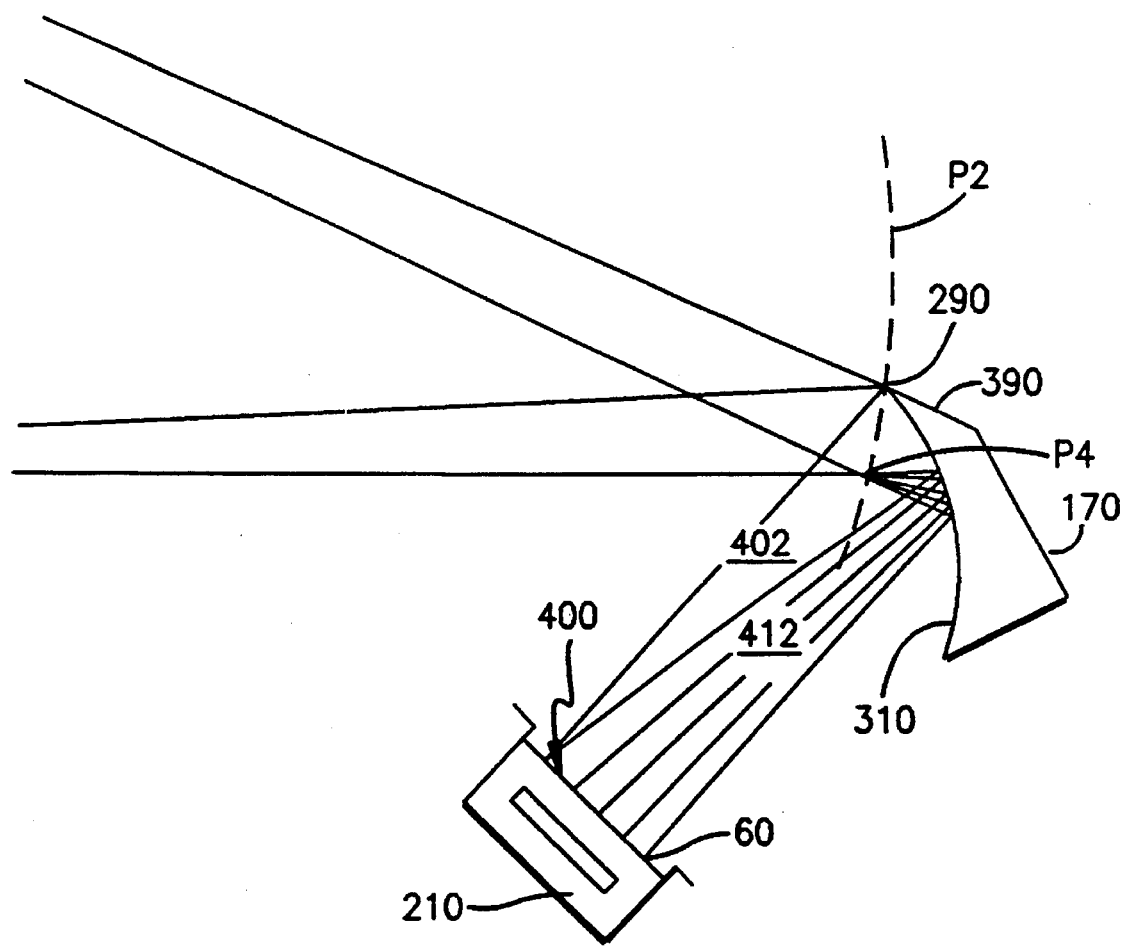
FIG. 5 shows an explanatory sketch of the radiation path at a deflection member and a temperature reference body according to the invention.
Figure 6:
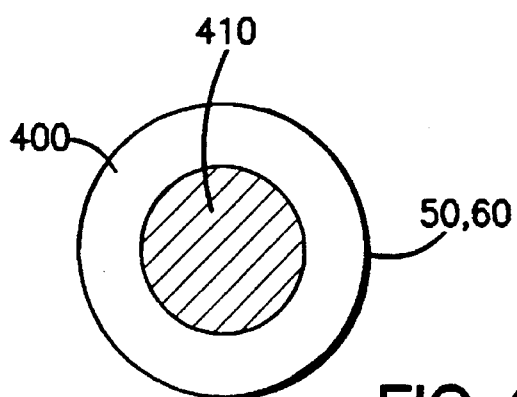
FIG. 6 shows the field of view of a detector on the reference body when a deflection member according to the invention is used.

With reference to FIGS. 5 and 6, detection of radiation from a temperature reference body in accordance with the invention will be described below. FIG. 5 is a view which observes the deflection arrangement 150 and reference body 60 from FIG. 1 above.

FIG. 5 shown an embodiment of an optical deflection member 170 which is arranged so that at least its one edge 390 has a sharp tip 290 on the focal line F2. An intermediate image, a reproduction of the detector 30 in the system, is in focus on the focal line F2.

The deflection member 170 is so shaped that radiation from a specific point on the reference body 60 is distributed to each individual point of the active surface of the detector 30. The expression "active surface of the detector" means that surface which receives and registers radiation. This means that each point on the active surface of the detector "sees" the same surface of the reference body 60. This implies that the requirement for uniform temperature distribution over the surface of the reference body 60 is not as critical as with conventional methods. The reference body can also be made smaller which gives the advantage that it is easier to achieve an even temperature across the entire surface of the reference body which is observed by the detector. Since the deflection member 170 is in the form of a reflecting member, the member can have a double-curved concave surface on the reflecting surface 310 in order to achieve this. For example, the surface 310 can thus be substantially ellipsoidal-shaped and have its focal points on the reference body 60 and the pupil 190 respectively. This is illustrated by the focal points 300 and 320, respectively, in FIG. 2.

When the deflection member 170 is in the form of a refraction member, the member can have a double-curved convex surface on the interruption surface or the interruption surfaces.

The reference body 60 can be placed so that a reproduction of the detector of the system is a little out of focus on an area 400 of the reference body 60 (FIG. 5 and FIG. 6). The reflecting surface 310 of the deflection member has such a contour that it places the system's pupil 190 on the surface 400 of the reference body 60. As shown in FIG. 5, and starting from the reference body 60, this can be described such that a radiation cone is formed with its base positioned on the surface 400 of the reference body 60 and with the tip of the cone positioned at that point where the focal line F2 forms a tangent to the tip 290 of the deflection member when the image point P4 reaches the tip 290 during the horizontal sweep. This is illustrated by the cone 402 in FIG. 5. The tip of the cone is formed by a focal point. This focal point is coincident with the image point P4 and moves along the focal line F2 during the sweep, whilst the base of the cone remains substantially stationary on the surface 400. The base of the cone is created by the reproduction of the system's pupil 190, and thereby a reproduction of the aperture 90. The midpoint of the reproduction and thus that of the base of the cone remains substantially stationary whilst the tip of the cone moves along the focal line F2 (see FIG. 6).

The reflecting surface 310 of the deflection member is thus shaped so that the reproduction of the aperture-diaphragm 90 remains stationary on the surface 400 of the reference body 60 when the image point P4 moves along the focal line F2 on the deflection member 170. The base of the cone is created by the reproduction of the aperture-diaphragm on the surface 400 of the reference body. Whilst the tip of the cone moves along the focal line F2, the midpoint 410 of the reproduction can remain stationary at the same point on the surface 400 (see FIG. 6).

The deflection member 170 can be arranged such that the majority of its reflected surface 310 is a little out of focus, except for the tip 290. When, during its sweep along the focal line, the image point P4 leaves the reflecting surface 310, the radiation path is interrupted so that a folded cone is achieved, as illustrated by the cone 412 in FIG. 5. When the radiation path runs in the cone 412, the diaphragm 90 is thus still reproduced on the surface 400.

Although in the above the invention has been described with a detector, it is of course within the scope of the invention to permit the detector to be in the form of a plurality of detector elements, whereby during calibration each detector element can receive radiation from substantially the same surface of the reference body. Depending on the inaccuracy of the pupil reproduction, separate detector elements can however receive radiation from surfaces on the reference body 60 which are not entirely coincident.

According to one embodiment of the calibration arrangement according to the invention, temperature calibration of an infra-red image recording system is achieved in the following manner: one or more detector elements alternately read the object 70 and a temperature reference body 50. The temperature of the temperature reference body can be varied so that the output signal of the detector element can be registered at different temperatures of the temperature reference body 70. By simultaneously registering the temperature of the temperature reference body and the corresponding output signal from the detector element, it is established which detector element output signal amplitude corresponds to which recorded temperature. In this manner, temperature calibration is attained so that a certain output signal from the detector element can accurately be said to correspond to a certain temperature on that surface which the detector element is observing.

SECOND EMBODIMENT

The arrangement according to a second embodiment of the invention can be used as a separate unit in order to calibrate in a quick, simple and cost effective manner the entire image recording system in, for example, an infra-red camera. The arrangement according to the second embodiment of the invention comprises a reference body 60 which emits radiation with an intensity which depends upon the temperature of the reference body 60, at least a temperature sensor 610 which registers the temperature of the reference body, and at least a deflection member 620.

Figure 7:
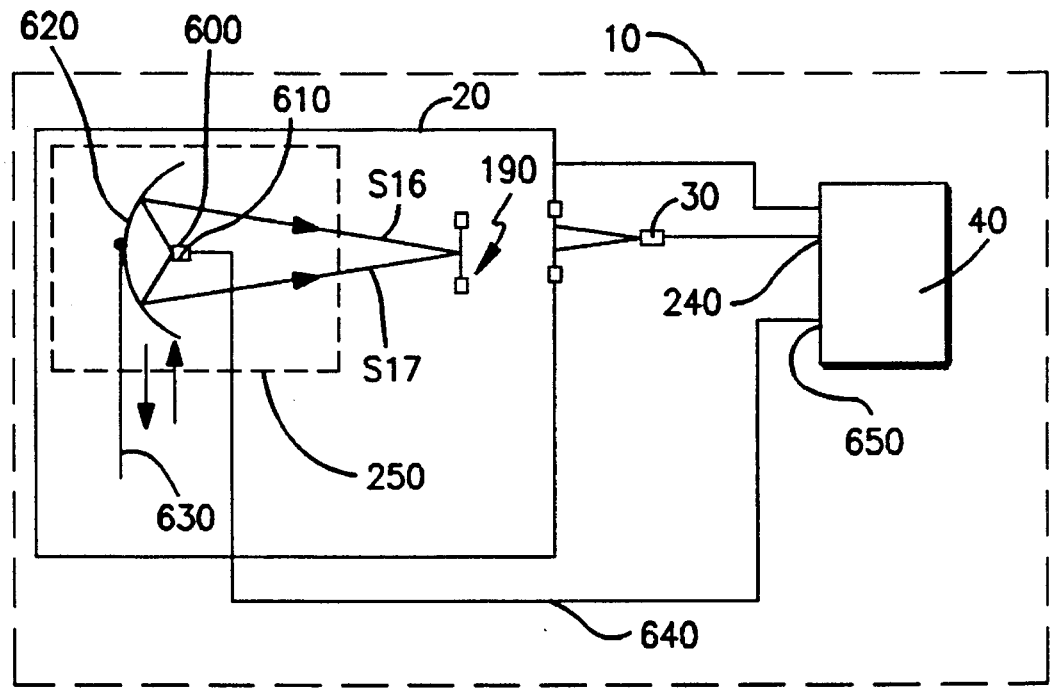
FIG. 7 shows a schematic side view of a system for image recording and an arrangement for calibration of the image system according to the invention.

A layout of the second embodiment according to the invention is shown in FIG. 7. According to the second embodiment of the invention, the deflection member 620 and an associated reference body 600 are arranged so that it can be projected into the radiation path somewhere in the lens 250. This is illustrated with the two arrows for the insertion and retraction direction on the axis 630 in FIG. 7. Alternatively, the deflection member 620 can be pivotally arranged so that the deflection member 620 and the reference body 600 can be introduced into the radiation path by means of rotation about a pivot point.

According to an alternative embodiment, deflection member 20 is arranged in front of the lens 250 of the system.

When the deflection member 620 is within, or in front of, the lens 250, the pupil 190 is reproduced the entire time on substantially the same surface of the reference body 600 (FIG. 1 and FIG. 7). Since the pupil 190 is a reproduction of the aperture-diaphragm 90 and the detector observes the diaphragm 90, the detector thus receives radiation from substantially one and the same surface on the reference body 600.

In FIG. 7, the radiation S16 and S17 is shown which is emitted from a point on the reference body 600. The beams S16 and S17 are reflected towards the deflection member 620 and converge to a point on the pupil 190. In FIG. 7 this is shown principally as though the beams are reflected directly from the deflection member 620 to the pupil 190, though in reality a plurality of optical components can of course be arranged therebetween.

The radiation emitted by the reference body is thus reflected by the deflection member 620 in the lens 250 of the image system 10 and passes through the sub-system 20, for example in a manner as described above, to the detector 30. The detector 30 delivers a signal dependent on the intensity of the received radiation to the input 240 on the calibration unit 40. The calibration unit 40 also receives information concerning the temperature of the reference body 600 from temperature sensor 610. The temperature information is transmitted from the temperature sensor 610 via a wire 640 to an input 650 on the calibration unit 40.

This implies that each image point, or pixel, which is registered by the detector corresponds essential to one and the same surface of the reference body 600. The image system can thus be calibrated with regard to each image point in the image grid. This is achieved by means of each registered image point, instead of corresponding to a large number of different image point surfaces on a object, corresponding to one and the same surface on the reference body 600. In this manner, simultaneous calibration of both image and temperature of the image recording system is obtained.

THIRD EMBODIMENT

In the above, the second embodiment has been described with reference to an image system based on registration of an object by means of optically scanning the field of view of the image system using a sweep arrangement. It also lies within the scope of the invention to instead use one or more matrix detectors in order to register a complete image. If a complete image during image recording from an object 70 is, for example, in the form of radiation emitting from N image points, each individual image point can continuously be registered by its own detector element in the matrix detector. The detector means thus comprises for example N detector elements. The number N can, for example, be 50.000.

When the second embodiment of the invention is used to calibrate the detector elements, the radiation from substantially the same surface of the reference body 600 is deflected to all N detector elements, thus implying that each element during calibration receives substantially identically strong radiation intensity.

FOURTH EMBODIMENT

According to a fourth embodiment of the invention, the arrangement includes a group of detectors, each of which detects its own image points in order to achieve a complete image. Such a detector group, so-called Focal Plane Array, FPA or matrix detector, comprises a plurality of detector elements arranged adjacent each other in a matrix pattern, and means for horizontal and vertical sweep respectively are not required. As in the above-described second embodiment, a deflection member can be introduced into the radiation path to obtain temperature calibration of an FPA system. Instead of introducing a disc with uniform temperature into the radiation path, as in the prior art, a deflection member according to the invention can be automatically introduced into the radiation path at certain moments in time. According to the fourth embodiment, the diaphragm of the image system is reproduced on the temperature reference body when the deflection member is introduced into the radiation path. The reflecting surface of the deflection member is shaped in such a manner that each detector element "sees" substantially the same surface of the temperature reference body, as described above. This implies that the temperature reference body can be made smaller and the requirements for uniform temperature distribution thereof do not need to be as stringent as in known prior art system.

According to one embodiment of the invention, the pupil of the system is reproduced on a smaller scale on the temperature reference body.

According to the fourth embodiment, image calibration can thus be achieved by calibrating the output signals of the various detector elements with respect to each other since all detector elements observe the same surface of the temperature reference body. Since all elements see substantially the same surface, they will also be calibrated to generate the same output signal.

With knowledge of the temperature of the temperature reference body, for example by measuring it, temperature calibration can also be achieved by placing the output signal of each detector element in relation to the temperature measured on the temperature reference body.

According to one embodiment of the invention, only image calibration is performed. According to a further embodiment, only temperature calibration is performed and according to yet another embodiment, both temperature and image calibration are performed.

The temperature and image calibration respectively can be carried out by means of a calibration unit which receives both the output signals of the individual detector elements as well as information concerning the temperature of the temperature reference body.

FIFTH EMBODIMENT

Figure 8:
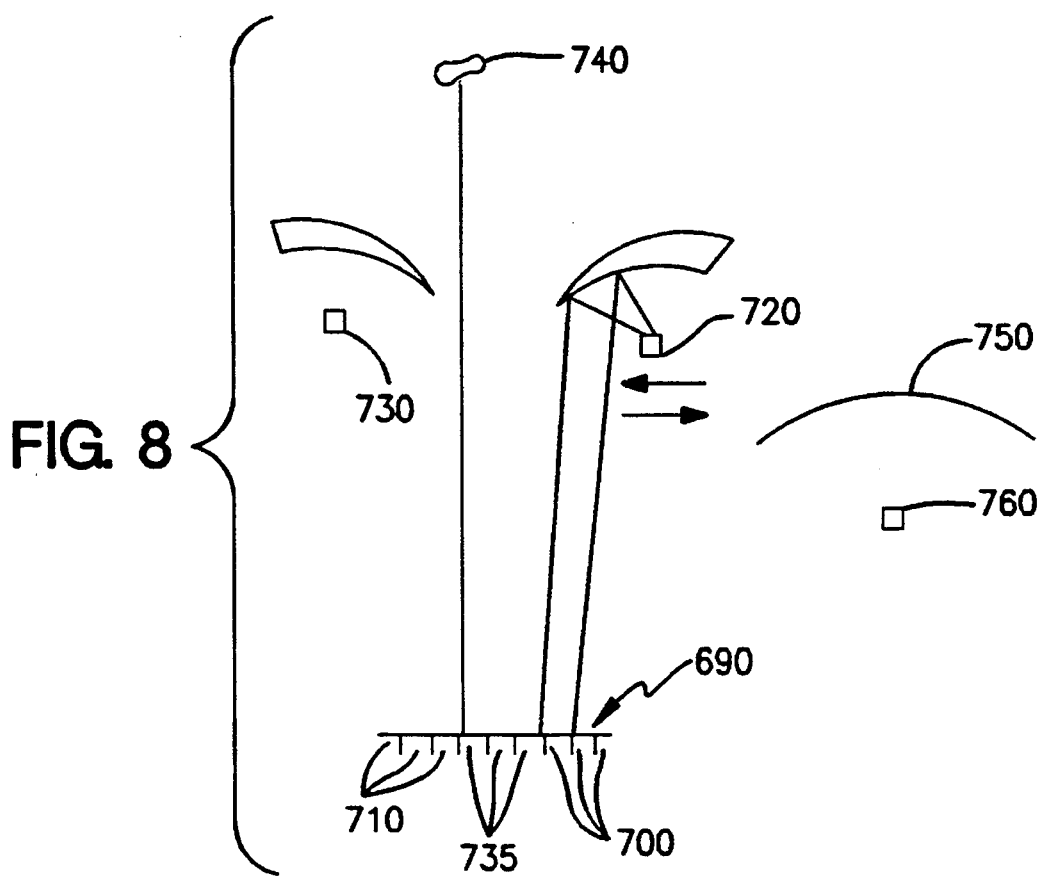
FIG. 8 shows an explanatory sketch of an arrangement for calibration of an image system comprising a plurality of detector elements.

It is also possible to permit various detector elements in a matrix detector 690 to receive radiation from various reference bodies having different temperatures during normal image recording (see FIG. 8). According to the fifth embodiment, some detector elements 700, 710 each observe a temperature reference body 720 and 730 the entire time, whilst other detector elements 735 in the detector group continuously observe an object 740. Not all of the optical components for this are shown in the explanatory sketch which is shown in FIG. 8. The output signals from the reference body-observing detector elements 700 and 710 in combination with information concerning the respective temperatures of the reference bodies 720 and 730 can then be used by the calibration unit to temperature calibrate those detectors which are observing the object. This temperature calibration does however presuppose that the input signal/output signal ratio of the individual detector elements 720, 730, 735 are substantially identical or that the detector elements incorporated in the detector means have been image calibrated first. Here the expression image calibration means that each detector element generates the same output signal when they receive the same value of radiation.

It can also be suitable to calibrate the detector elements with respect to each other. According to the fifth embodiment, such calibration of the detector elements with respect to each other can be performed by means of automatically introducing a deflection member 750, according to the invention, into the radiation path at certain moments in time. The deflection member 750 can be arranged to be introduced into the radiation path between the object 740 and the detector means 690, and in its introduced position reproduce the diaphragm of the image recording system on a third reference body 760 in a manner as described above.

The above mentioned calibration unit can provide output signals to a display unit which shows a thermal image of the object whilst indicating the temperatures or temperature interval for various parts of the image.

During image recording or reading of an object, the various detector elements in the matrix detector can be read consecutively and corresponding output signals can be delivered in the same order to the calibration unit and corresponding calibrated signals can be fed further to, for example a display unit. In this manner, an image signal can be obtained which substantially corresponds to that image signal which is obtained from a scanning system with a detector element.

We claim:

1. In an arrangement for calibration of at least one radiation-sensitive detector means, comprising an aperture (90), at least one reference body (50, 60, 600) which emits radiation with a measurable intensity, at least one deflection member (160, 170, 620) which deflects radiation from the reference body, and at least one radiation-sensitive detector means (30) which detects the radiation value and generates an output signal dependent on the detected radiation value; the improvement wherein during reference measurement the deflection member is arranged to reproduce the aperture (90) on the reference body (50, 60, 600), and the deflection member (160, 170, 620) deflects the radiation such that the midpoint of the reproduction of the aperture (90) remains on substantially the same area of the surface of the reference body (50, 60, 600) during that time period in which the detector means receives radiation which is transmitted from the reference body and which passes through the aperture (90).

2. Arrangement according to claim 1, wherein the detector means (30) comprises a group of detector elements which are in the form of a matrix detector, and the deflection member (160, 170, 620) is so shaped that, during reference measurement, each detector element receives radiation from substantially the same area of the surface (400) of the reference body (50, 60, 600).

3. Arrangement according to claim 1 wherein the detector means (30) is arranged to alternately receive radiation from an object (70) and radiation from the reference body (50, 60, 600).

4. Arrangement according to claim 1, further comprising a sweep device (120, 100, 260) for optically scanning an object (70) and at least one reference body (50, 60, 600) in at least one dimension, the sweep device (120, 100, 260) being arranged to move a first image point (P4) along a focal line (F2) on the deflection member (160, 170) during a sweep, and the deflection member (160, 170, 620) being arranged to reproduce the aperture (90) on the reference body (50, 60) during that portion of the sweep when the first image point (P4) is moved along the focal line (F2) on the deflection member (160, 170).

5. Arrangement according to claim 1, wherein a sharp tip (290) on the deflection member (160, 170) is arranged to form a tangent to a focal line (F2), a radiation beam emitted from the reference body passing through a focal point on said focal line (F2), which focal point is coincident with a first image point (P4), and the arrangement being arranged to achieve a rapid transition between scanning of an object and reading of the reference body when said first image point (P4) passes the tip (290) during the movement of said point along said focal line (F2).

6. Arrangement according to claim 1, where the deflection member can be introduced into a path followed by radiating from an object to the detector means, and when the deflection member is in the radiation path, the detector means observes the temperature of the reference body.

7. Arrangement according to claim 1, wherein the detector means receives radiation from an object when the deflection member is not within a path of radiation from said object, and in that each detector element of the detector means receives radiation from substantially the same area of the surface on the temperature reference body when the deflection member is in said radiation path, and in that a calibration unit is arranged to calibrate output signals of the detector elements with respect to each other when the deflection member is within said radiation path.

8. Arrangement according to claim 1 wherein there are a plurality of reference bodies each having a different temperature arranged in a predetermined classification.

9. Arrangement according to claim 1 wherein the temperature of said at least one said reference body is variably selectable.

10. Arrangement according to claim 9, wherein the temperature of said at least one reference body is variable with time according to a predetermined pattern.

11. Arrangement according to claim 1, wherein the reference body is arranged to emit radiation with an intensity which is dependent upon the temperature of the reference body, the arrangement comprising at least one temperature sensor (200, 210, 610) which registers the temperature of the reference body (50, 60, 600), and the arrangement further comprising a calibration unit (40) which is connected to the temperature sensor (200, 210, 610) and to the detector means, which calibration unit is arranged to determine the relationship between the registered temperature and the output signal generated by the detector means to thereby achieve temperature calibration.

12. Arrangement according to claim 1 wherein the deflection member (160, 170, 620) is in the form of a reflecting element, and the reflecting element has a substantially concave surface in order to deflect radiation.

13. Arrangement according to claim 1, wherein the deflection member (160, 170, 620) is in the form of a reflecting body, and in that the reflecting body is concavely curved on at least one surface in order to deflect radiation.

14. Arrangement according to claim 1 wherein the detector means (30) is in the form of a matrix detector.

* * * * *